May 8, 1956  W. D. JOHNSON  2,744,549
PRECISION GUIDE FENCE FOR POWER TOOL WORK TABLE
Filed May 21, 1953  3 Sheets-Sheet 1
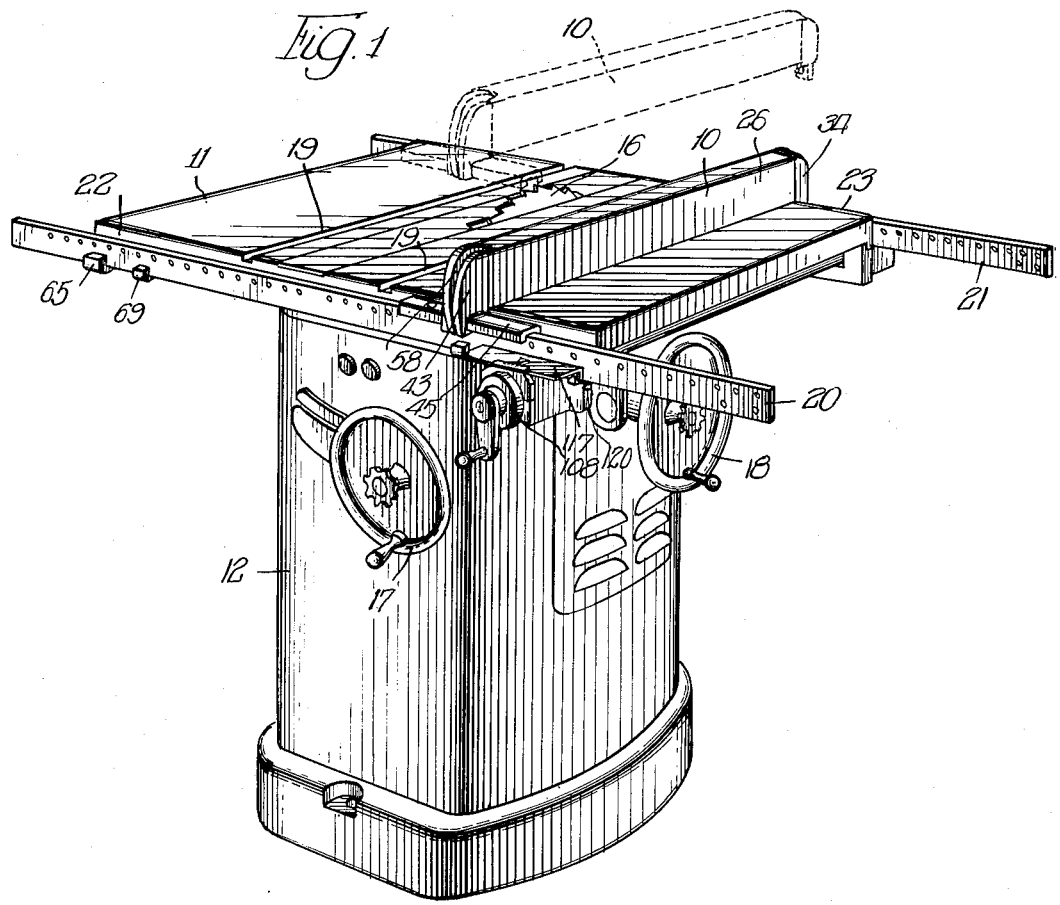
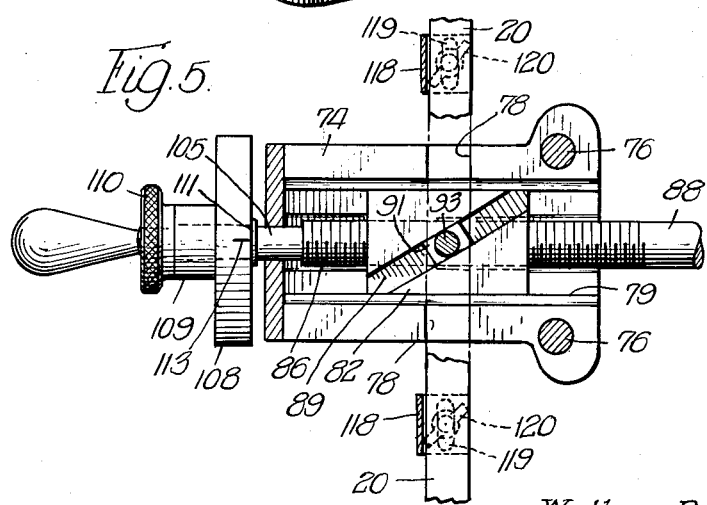
INVENTOR.
Wallace D. Johnson,
BY
Cromwell, Greist & Warden
ATTYS.

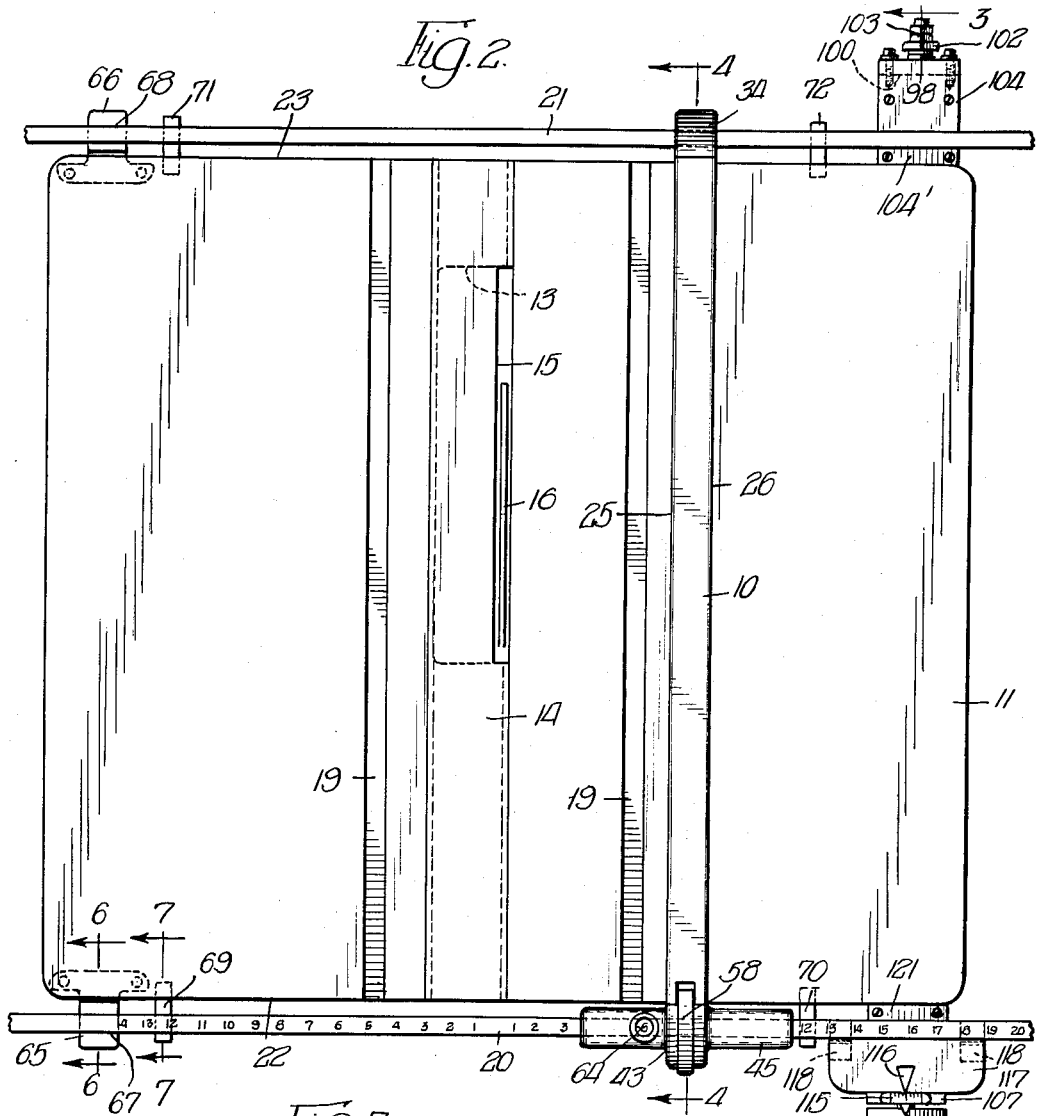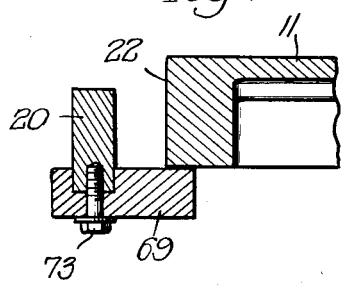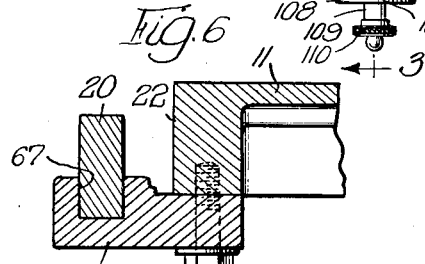

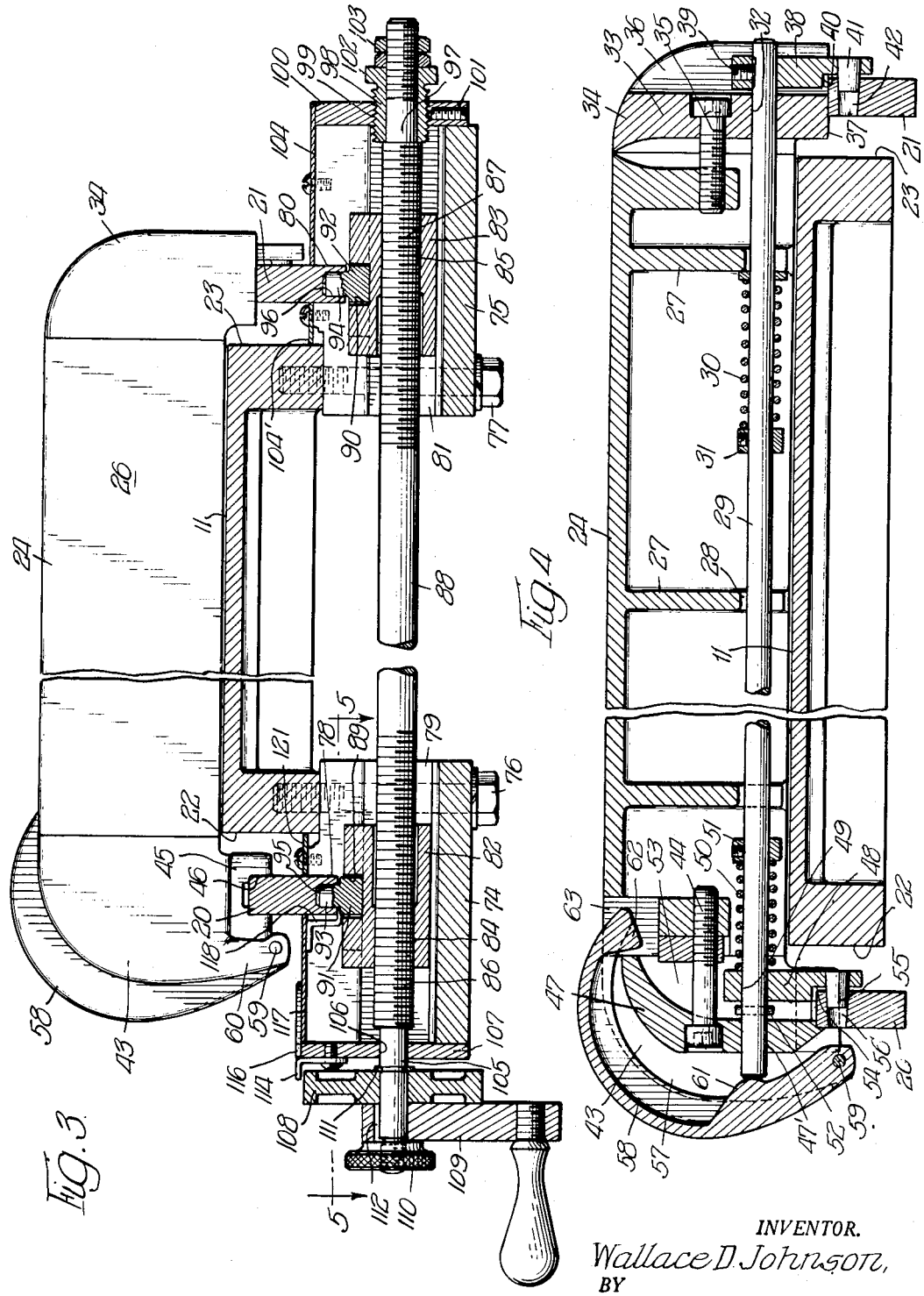

United States Patent Office 2,744,549
Patented May 8, 1956

2,744,549

PRECISION GUIDE FENCE FOR POWER TOOL WORK TABLE

Wallace D. Johnson, Beloit, Wis., assignor to Yates-American Machine Company, Beloit, Wis., a corporation of Delaware Application May 21, 1953, Serial No. 356,575

17 Claims. (Cl. 143—174)

This invention relates to power tools of the type in which a cutting tool is mounted in a slot in a work table and the work is moved against the cutting tool along the surface of the table, and is more particularly concerned with improvements in a rip gauge or guide fence for guiding the work in a predetermined path relative to the cutting tool.

It is a general object of the invention to provide a guide fence for use on the work table of a mechanically driven tool such as a power saw or the like and a supporting mechanism which is so constructed that the guide fence may be readily positioned on the table in the desired location relative to the cutting tool.

It is a more specific object of the invention to provide a work fence for the table of a power driven tool, and mounting mechanism therefor which is capable of being adjusted to quickly and accurately locate the guide fence at the desired location on the table relative to the tool.

It is a still more specific object of the invention to provide a guide fence for the work table of a power driven tool and mechanism for adjustably mounting the fence thereon which includes movably mounted parallel support bars or rails for the fence, a latching mechanism for attaching the fence to the bars and mechanism for moving the bars to properly adjust the fence at the desired distance from the cutting edge of the tool and in proper alignment for guiding the work as it is moved against the tool.

It is another object of the invention to provide a guide fence for use on the work table of a power driven cutting tool, such as a table saw, and mechanism for mounting the fence on the table which comprises movable support bars adjacent the front and rear edges of the table, latching elements for selectively attaching the fence to the support bars at predetermined points along the same, and operating mechanism engaging the bars and operable to move the same simultaneously in either direction parallel to the front and rear edges of the work table, which bar operating mechanism is adjustable to shift the bars in either direction relative to each other whereby to permit the working surface of the fence to be brought into parallel relation with the plane of operation of the cutting tool.

These and other objects and advantages of the invention will be more fully understood from a consideration of the mechanism which is shown by way of illustration in the accompanying drawings, wherein:

Fig. 1 is a perspective view of a power saw having mounted thereon a guide fence and associated supporting mechanism which incorporates therein the principal features of the invention;

Fig. 2 is a plan view of the saw table or top with the guide fence mounted thereon;

Fig. 3 is a section, to an enlarged scale, taken on the line 3—3 of Fig. 2 with portions broken away;

Fig. 4 is a section, to an enlarged scale, taken on the line 4—4 of Fig. 2, with portions broken away;

Fig. 5 (Sheet 1) is a section taken on the line 5—5 of Fig. 3, and

Figs. 6 and 7 (Sheet 2) are detail sections, to an enlarged scale, taken on the lines 6—6 and 7—7 of Fig. 2.

Referring to the drawings, a rip gauge or guide fence 10 having embodied therein the principal features of the invention, is shown mounted on the top or work table 11 of a conventional power driven circular saw. The mechanism may, of course, be mounted on the work table of any similar power operated tool where it is desirable to be able to accurately adjust the position of the fence relative to the path of movement of the cutting edge or surface of the tool so that the tool may be operated with maximum efficiency and with maximum safety to the operator.

The table 11, which is supported on the base 12, is generally rectangular in shape with a transversely extending blade receiving aperture 13 intermediate its ends having an insert or cover plate 14 which is slotted at 15 to receive the saw blade 16, the latter being mounted on an arbor mechanism (not shown) and having associated therewith mechanism whereby it may be raised and lowered by turning the handle 17 and tilted by turning handle 18, in the usual manner. The table is also provided with grooves 19 for receiving a cross cutting mitre gauge (not shown), which grooves extend parallel to the plane of the blade 16.

The guide fence 10 is positioned in transversely extending relation on the table 11 and adapted to be adjusted to provide a vertical working surface parallel with the plane in which the saw blade 16 is operating. The guide fence 10 rests on the top of the table 11 and is supported at its opposite ends on front and rear supporting bars or rails 20 and 21 which are arranged in parallel spaced relation to and adjacent the front and rear edges 22 and 23, respectively, on the table 11.

The guide fence 10 comprises a center portion 24 of inverted U-shaped or channel cross section which is approximately the same length as the width of the table 11. The opposite side faces 25 and 26 of the fence 10 are accurately machined so that they are in parallel planes. The fence is positioned with the open side of the member 24 against the surface of the table 11, and with the side faces 25 and 26 perpendicular thereto. The member 24 is provided with cross webs 27 (Fig. 4) spaced along the length thereof, each of which is apertured or slotted at 28 to receive a lock bar or rod 29 extending within the member 24, and held in sliding relation therein by a compression spring 30 mounted at the rear end of the bar 29 and engaging a stop collar 31 on the bar at one end and the rearmost cross web 27 at the other end, which spring urges the bar 29 toward the front end of the fence.

The locking bar 29 extends beyond the rear end of the member 24 through a bearing aperture 32 in the cross web portion 33 of an end mounting member 34 which is secured by the bolt 35 to the end of the member 24. The end mounting member 34 is shaped to provide a rearwardly opening vertical slot 36 into which the end of the locking bar 29 extends. The lower edge 37 of the member 34 rests in sliding relation on the top of the rear supporting bar 21 and supports the rear end of the fence thereon. A rear lock or latch plate 38 is rigidly secured by set screw 39 adjacent the end of the lock bar 29 which extends through an aperture in the same. The lock plate 38 is received in the vertically extending guideway forming slot 36 in the member 34 and extends below the lower edge 37 thereof with the inwardly facing side notched at 40 to receive the edge of the rear support bar 21. A lock or latch pin 41 is secured in an aperture adjacent the lower end of the latch plate 38 and extends toward the rear face of the bar 21 for engagement in one of a series of longitudinally spaced holes 42 therein. The pin 41 is tapered inwardly and tends to center itself in the hole 42 when the lock bar 29 moves forward to pull the plate 38 toward the support bar 21.

The member 24 is provided at the front end with a generally T-shaped end supporting or mounting member 43 having a stem or body portion which extends upwardly at the front of the fence member 24 and is secured thereto by the bolt 44. The head portion 45 (Figs. 1 and 2) of the mounting member 43 extends along the front supporting bar 20 and is provided at the opposite ends with downwardly opening recesses 46 (Figs. 2 and 3) forming guideways which receive the bar 20 in sliding relation therein. The head portion 45 is relatively long and supports the front end of the fence in nontilting relation on the bar 20. The body portion of the mounting member 43 is provided with a cross web 47 in the lower portion of which there is a bearing aperture 47' receiving the end of the lock bar 29.

The lock bar 29 carries adjacent its forward end a lock or latch plate 48 which is apertured at 49 to receive the bar 29 in sliding relation and which is floatingly held on the bar by compression spring 50 which bears against the inner face of the locking plate 48 at one end and against a stop collar 51 on the bar 29 at the other end. The spring 50 urges the plate 48 toward a stop pin 52 on the bar 29 and the plate 48 is held in upright position by an inwardly facing vertical slot or guideway forming recess 53 in the body portion of the end supporting member 43. The latch plate 48 projects below the bottom of the mounting member 43 and is notched at its outer face at 54 to receive the inner edge of the front rail 20. A lock or latch pin 55 is secured in an aperture in the lower end of the plate 48 and is provided with a tapered forwardly projecting end which is adapted to be received in one of a series of spaced holes 56 provided in the front supporting bar 20. The floating mounting for the latch plate 48 insures that any wear in the latch pins 41, 55 and the pin receiving holes 42, 56 will not effect the operation of the latch mechanism and that the fence will be at all times securely anchored or attached to its supporting bars.

The upper body portion of the mounting member 43 is provided with a forwardly opening vertical slot or recess 57 which accommodates a release lever 58 for the lock bar 29. The lever 58 is generally C-shaped and is mounted at the lower end on the pivot 59 extending between a pair of mounting ears 60 (Figs. 3 and 4) on the mounting member 43. A short distance above the pivot 59 the lever 58 is provided with an inwardly extending protuberance 61 which is adapted to engage the end of the lock bar 29 so that inward movement of the lever 58 urges the lock bar 29 rearwardly and moves the latch plates 38 and 48 out of latching engagement with the front and rear supporting bars 20 and 21. At its upper end the lever 58 is provided with a downwardly projecting protuberance 62 which is received in a recess 63 in the top of the member 24 and which limits the movement of the lever 58.

The holes 42 in the rear supporting bar 21 and the holes 56 in the supporting bar 20, which may be straight or tapered in the same manner as pins 41 and 55, are spaced a predetermined distance apart, preferably one inch, along the supporting bars. The front supporting bar 20 is provided with numerals above each of the holes 56 indicating distance from the saw blade and the head portion 45 of the mounting member 43 is provided with a sight hole 64 (Fig. 2) to permit the operator to observe the distance between the fence and the saw blade, to the nearest inch.

The front and rear supporting bars 20 and 21 are mounted at one end of the table 11 by means of fixed brackets 65 and 66 (Figs. 2 and 6) which are secured to the under side of the table 11 and provided with upwardly opening guideway forming recesses 67 and 68, respectively, for receiving the bars 20 and 21 in sliding relation. Each of the bars 20 and 21 is provided at opposite ends with small brace plates 69, 70 and 71, 72 (Figs. 2 and 7) which are secured at one end to the bottom edge of the bars by bolts 73 and which project beneath and engage the edge of the table 11 to resist the tilting strain on the bars due to the action of the latch plates 38 and 48.

At the other end of the table the front and rear fence supporting bars 20 and 21 are supported on and attached to an adjusting mechanism which controls the longitudinal movement of the bars. The adjusting mechanism comprises front and rear elongate supporting blocks or bracket members 74 and 75 (Figs. 1 and 3) which are channel shaped in cross section and which are secured to the under side of the table in forwardly and rearwardly projecting upwardly opening relation by bolts 76 and 77, respectively.

The side walls of the front block member 74 are provided with aligned upwardly opening cross slots or recesses 78 (Fig. 3 and 5) extending at right angles to the longitudinal guideway formed by the internal recess 79, which cross slots 78 are spaced forwardly of the front edge 22 of the table and receive in sliding relation therein the front supporting bar 20. The side walls of the rear block member 75 are provided with similar oppositely disposed aligned slots or notches 80 which are at right angles to the internal guideway forming recess 81 and which receive in sliding relation therein the rear supporting bar 21. The front and rear supporting block members 74 and 75 receive in their internal guideway forming recesses 79 and 81 rectangular slide blocks 82 and 83, which slide blocks have internal threaded bores 84 and 85, respectively, for receiving the threaded end portions 86 and 87 of an adjusting rod or screw 88. The screw end portions 86 and 87 on which the slide blocks 82 and 83 are received are threaded oppositely so that rotation of the screw 88 moves the slide blocks 82 and 83 in the guideways 79 and 81 simultaneously toward or from each other depending upon the direction of rotation of the screw 88.

The slide blocks 82 and 83 are provided on their upper faces with oppositely directed diagonal slots 89 and 90 which receive rectangular head portions 91 and 92 of fencebar connecting members, the latter having upstanding pivot pin formations 93 and 94 which are received in holes 95 and 96 provided in the bottom edge of the front and rear fence supporting bar members 20 and 21, so that movement of the slide blocks 82 and 83 upon rotation of the adjusting screw 88 causes the supporting bars 20 and 21 to move simultaneously, in the direction of their long axis.

At the rear end the adjusting screw 88 is reduced in diameter at 97 and receives in rotatable relation thereon an apertured end adjusting sleeve member 98. The adjusting sleeve 98 is externally threaded and engages in a threaded aperture 99 in an end plate 100 which is secured to the rear end of the supporting block member 75 and which is provided with a set screw 101 for locking the sleeve 98 in adjusted position. The sleeve 98 is provided with a knurled operating head 102 and is locked on the screw 88 by lock nuts 103 on the end of the same. Cover plates 104 and 104' (Figs. 2 and 3) are secured on the top of the block member 75 which completes the rear support assembly.

At the forward end the adjusting screw 88, has a reduced portion 105 which extends through a bearing aperture 106 in a front plate 107 secured to the front end of block member 74 and receives a graduated dial 108, a turning handle 109 and a dial locking nut 110 on a threaded end portion thereof. The dial 108 is spaced from the cover plate 107 by a snap ring or locking collar 111 on the shaft portion 105, providing sufficient clearance between the snap ring 111 and the plate 107 for some endwise adjustment of the screw 88. The dial 108 is free to turn on the adjusting screw 88 when the locking member 110 is backed off or loosened. The handle 109 is locked against rotation on the adjusting screw 88 by the key 112. The dial 108 is provided with quarter graduations 113 (Fig. 5) and may be set relative to a fixed pointer 114 (Figs. 2 and 3) which is secured on the face plate 107.

A relatively small fixed scale 115 having 1/16 inch graduations is secured to the top edge of the face plate 107 for cooperation with a pointer 116 which is secured on a movable plate member 117. The plate member 117 rests on the top edge of the side walls of the supporting block member 74 and is adjustably attached to the rail 20 by means of angular attaching lug members 118 which are slotted at 119 and adjustably secured to the bottom edge of the rail 20 by thumb screws or similar fasteners 120 (Fig. 5). A small top cover plate 121 (Figs. 2 and 3) is secured on the top of holder block 74 between the fence supporting bar 20 and the front edge 22 of the work table 11 to complete the front support assembly.

When in use the fence 10 is rigidly held in position at both ends by engagement of the tapered pins 55 and 41 in the apertures 56 and 42 of the rails 20 and 21. The fence 10 may be readily lifted off the bars or rails 20 and 21 by pivoting the release lever 58 inwardly which moves the rod 29 toward the rear end of the fence and withdraws the pins 41 and 55 from engagement in the apertures 42 and 56. This arrangement permits complete disengagement and release of the fence 10 from the supporting bars 20 and 21 so that it may be placed on the other side of the saw blades 16 without the necessity of first lowering the saw blade 16 or of sliding the fence to the end of the supporting bars.

The fence 10 may be initially adjusted to bring the working side or face into a plane parallel to the plane of operation of the saw blade 16 by movement of the adjusting sleeve or nut 98 (Fig. 3), which of course, moves the adjusting screw 88 in the direction of its longitudinal axis and the slides 82 and 83 in the guideways 79 and 81 a sufficient distance to align the working face of the fence 10 with one of the table slots 19 for the cross cutting mitre, the sides of which are accurately machined so that they are in a plane parallel to the plane of operation of the saw blade 16. With the fence 10 properly adjusted for parallelism with the blade 16 it may be "zeroed in" or adjusted to compensate for different widths of cut that different types of saw blades make. To make this adjustment the fence is positioned on the supporting bars 20 and 21 adjacent the blade and the bars moved towards the blade until the fence touches the blade very lightly, the fence being latched to the supporting bars 20 and 21 by engagement of the tapered pins 55 and 41 in the apertures 56 and 42 nearest to the blade 16. The thumb screws 120 are then loosened and the movable plate member 117 which carries the pointer 116 is adjusted on the front supporting bar 20 until the pointer 116 is directly opposite the first graduation mark on the scale 115 after which the thumb screws 120 are tightened. The dial lock 110 is then loosened and the dial 108 is turned until a graduation mark 113 is in line with the dial pointer 114, the handle 109 remaining stationary while this adjustment is made. Thereafter the dial lock 110 is tightened and the mechanism is ready for use.

In setting the fence 10 for cutting a desired distance from the saw blade 16 the fence 10 is first positioned on the supporting bars 20 and 21 with the latch pins 55 and 41 engaged in the apertures 56 and 42 which are located to the nearest inch from the plane of the blade. The screw handle 109 may then be operated to rotate the adjusting screw 88 and shift the bars 20 and 21 simultaneously in the direction of their length to locate the fence in the exact position desired. The fence is moved to within 1/16 of an inch of the desired distance by rotating the screw 88 until the pointer 116 registers the desired distance on the fixed scale 115. Thereafter an additional very fine adjustment in sixty-fourths of an inch may be made by rotating the shaft 88 and noting the position of the graduations 113 on the dial 108 relative to the pointer 114. Each full turn of the handle 109 moves the supporting bars 20 and 21 and the fence 1/16 of an inch, so that the quarter turn graduations 113 on the dial 108 each indicate 1/64 inch movement of the fence. In this manner the distance between the operating face of the fence 10 and the saw blades may be accurately adjusted within 1/64 of an inch.

The fence supporting bars 20 and 21 may be made any desired length and may extend beyond the end edges of the table 11. The fence 10 may, of course, move across the supporting bar adjusting mechanism, since it is arranged at both ends to provide clearance for movement of the end supporting brackets 34 and 43 above the same.

While specific details of construction have been referred to in describing the illustrated mechanism it will be understood that other details of construction may be resorted to within the spirit of the invention.

I claim:

1. A mechanically driven tool having a work receiving table associated therewith, a work guiding gauge movable on said work table to position the same relative to the tool, and means on said work table for securing said gauge in adjusted position thereon, said securing means comprising elongate supporting bars positioned for sliding movement in their axial direction adjacent opposite edges of said work table and below the working surface thereof, mechanism associated with said gauge and said supporting bars for securing opposite ends of said gauge in selected positions on said supporting bars, fixed supports on said work table below the surface thereof for receiving said supporting bars in axial sliding relation thereon, mechanism connecting said supports and said supporting bars for simultaneously moving said supporting bars relative to said supports and in the same direction along the edges of said table, and mechanism connecting said supporting bars and said supports for simultaneously moving said supporting bars relative to said supports and in opposite directions relative to each other, whereby to adjust the position of said gauge on said work table and relative to the plane of operation of said tool.

2. In a woodworking machine having a work receiving table, and a work guiding gauge movable thereover, means for guiding and securing the gauge with respect to the work table, said means comprising elongate end supporting bars positioned in parallel relation adjacent opposite edges of the table, latch members on said gauge for securing opposite ends of said gauge in selected position on said supporting bars, bracket members extending from said work table for supporting said gauge supporting bars in sliding relation thereon, an adjusting rod rotatably mounted in said bracket members, means for effective movement of said adjusting rod relative to said bracket members in the direction of the longitudinal axis of said adjusting rod, connecting members between opposite ends of said adjusting rod and said supporting bars which are movable with said rod upon longitudinal movement of said rod and which are movable relative to said adjusting rod upon rotation of the same, and a pivoted sliding connection between said connecting members and said supporting bars whereby said supporting bars are simultaneously moved in the same direction upon rotation of said adjusting rod and in opposite directions upon relative axial movement between said adjusting rod and said brackets to adjust the position of said gauge relative to said work table.

3. In a power driven machine having a work receiving table, a work guiding fence movable thereover, means for securing said fence in adjusted position on said work table, said securing means comprising elongate end supporting bars positioned in parallel relation adjacent opposite edges of said work table and beneath the surface thereof, latch members at opposite ends of said fence extending adjacent said supporting bars for releasably securing said fence in selected positions on said supporting bars, bracket members extending from said work table and having guideways for supporting said fence supporting bars in sliding relation thereon, and mechanism associated with said bracket members for simultaneously moving said fence supporting bars in said guideways in either the same or opposite directions, whereby to adjust the postion of said fence on said work table.

4. A rip gauge for use on the work table of a power driven cutting tool, means for adjustably supporting said gauge on said work table comprising parallel rails arranged adjacent the opposite edges of the work table, latch means on the gauge adapted to be engaged with the rails and fixedly secure the gauge thereto, supporting brackets at opposite edges of the work table having slots therein for receiving the rails in sliding relation, an adjusting screw extending through the brackets in a direction transversely of the direction of said rails, cam slide blocks mounted on said screw, movable connecting means between the cam slide blocks and the rails, and means for rotating the adjusting screw to move the slide blocks along the same and to move the rails lengthwise along the side edges of the work table.

5. A work guiding fence for use on the work table of a power operated tool, supporting means comprising parallel rails arranged adjacent opposite edges of the work table, latch means on opposite ends of the fence adapted to be engaged with the rails to fixedly secure the ends of the fence thereto, and adjusting means for the rails, said rail adjusting means comprising holder members having guide slots therein parallel with the edges of the work table for receiving the rails in sliding relation, an adjusting screw extending through the holder members in a direction at right angles to said guide slots, cam slide blocks mounted for movement on said screw, diagonal slots in said cam slide blocks, pivoted means on said rails having a head slidable in said diagonal slots in the cam slide blocks, and means for rotating the adjusting screw to move the slide blocks and thus move the rails in the lengthwise direction parallel to the side edges of the work table.

6. A precision rip fence for use on a power operated machine tool having a work table, fence supporting rails arranged adjacent the front and rear edges of the table, releasable latch mechanisms associated with the rails and the ends of the fence for rigidly securing the fence in selected position on the rails, forward and rear holder blocks attached to the work table and extending at opposite edges thereof, said holder blocks having guideway forming slots therein extending parallel with the side edges of the table and receiving the rails in sliding relation, said holder blocks having guideway forming recesses extending transversely of the slots for the rails, slide blocks positioned in said guideway forming recesses, an adjusting screw connected at opposite ends in screw threaded relation with the slide blocks, connecting members between the slide blocks and the rails, said connecting members having a pivot portion and a head portion, said pivot portion being connected with the rail, said slide blocks having cam slots, said connecting member head portions being seated in said cam slots, and means for rotating the adjusting screw to move the slide blocks within predetermined limits towards and from each other.

7. A precision fence for use on a power driven machine tool having a work table, end supporting rails arranged adjacent opposite side edges of the work table, releasable mechanisms associated with the rails and the ends of the fence for rigidly securing the fence in selected positions on the rails, mechanism for supporting the rails in free sliding relation at one end of the table, and mechanism for adjustably supporting the rails at the other end of the table, said last mentioned rail supporting mechanism having guideways therein parallel with side edges of the table for receiving the rails in sliding relation and other guideways extending transversely of the rail receiving guideways, slide blocks movably mounted in said last mentioned guideways and having diagonal cam surfaces, an adjusting screw connected in screw threaded relation with the slide blocks and adapted to move said slide blocks toward and from each other, and connecting means between the slide blocks and the rails, said connecting means having pivotal engagement with the rails and sliding engagement with the cam surfaces on said slide blocks.

8. An adjustable work guide member for use on a power driven machine tool having a work table, supporting bars arranged adjacent the side edges of the table, releasable mechanisms associated with the supporting bars and the work guide member for rigidly securing the work guide member in selected positions on the supporting bars, mechanism on the work table for supporting the bars in free sliding relation thereon, and mechanism on the work table for engaging and adjusting said bars relative to the work table, said bar engaging and adjusting mechanism having guideway formations parallel with the side edges of the table for receiving the rails and also having guideway forming recesses extending transversely of the guideway formations for the bars, movable members positioned in said recesses, an adjusting bar, said movable members being mounted on said adjusting bar and being movable toward and from each other, and connecting means between said movable members and the guide member supporting bars whereby said supporting bars are movable in response to predetermined movements of said adjusting bar.

9. An adjustable rip fence for use on a power driven machine tool having a work table, supporting bars arranged adjacent opposite side edges of the table and below the working surface thereof, said fence supporting bars having apertures spaced lengthwise thereof, said fence having latch mechanisms at the ends thereof extending below the working surface of the table, which latch mechanisms include projecting pins on said fence for engaging in the apertures in said supporting bars to rigidly secure the fence in selected positions on the supporting bars, mechanism for mounting said supporting bars for sliding relation relative to the work table, said mounting mechanism comprising brackets extending at opposite edges of the table below the working surface thereof, said brackets having guideways therein parallel with the side edges of the table and receiving the rails in sliding relation, an adjusting screw mounted in said brackets for rotative and axial movement therein, means connecting said screw with said fence supporting bars to move said supporting bars lengthwise in the same direction upon rotation of said adjusting screw and to move said supporting bars in opposite directions upon axial movement of said adjusting screw, and gauge means associated with said screw and said fence supporting bars to indicate the extent of movement of said supporting bars.

10. A rip fence for use on the work table of a power driven cutting tool and means for supporting the same for adjustment thereon, said supporting means comprising parallel rails arranged adjacent opposite sides of the work table, latch means on the fence adapted to engage the rails and fixedly secure the fence thereto, supporting brackets on the work table having slots therein for receiving the rails in sliding relation, an adjusting screw extending through the brackets in a direction crosswise of the rail receiving slots, means connecting the adjusting screw and the brackets for rotation of the adjusting screw relative to the brackets, cooperating means on the adjusting screw and the brackets for moving the adjusting screw in an axial direction relative to the brackets, and means connecting the adjusting screw and the rails for simultaneously moving the rails longitudinally in the slots and in the same direction in response to rotative movements of the adjusting screw and for simultaneously moving the rails longitudinally and in opposite directions in response to axial movements of the adjusting screw.

11. A rip fence for use on the work table of a power driven tool and means for supporting the same for adjustment thereon relative to the tool, said supporting means comprising parallel rails arranged adjacent opposite sides of the work table, latch means on the fence adapted to engage the rails and fixedly secure the fence thereto, supporting brackets having guide means for receiving the rails in sliding relation, an adjusting screw extending through the brackets in a direction transversely of the longitudinal axis of the rails, means on the brackets for supporting the adjusting screw for rotation and for axial movement relative to the brackets and means connecting the rails and the adjusting screw for simultaneously moving the rails in the same direction upon rotation of the adjusting screw and means for simultaneously moving the rails in opposite directions upon axial movement of the adjusting screw.

12. A work gauge adapted for use on a machine tool having a work table and parallel supporting rails at opposite edges of the table, said gauge having a body portion and slotted end portions slidably mounted on the supporting rails, latch plates operable in the slots in each of said end portions, a carrier bar on which the latch plates are mounted, said carrier bar being slidably mounted within the body and end portions of said gauge, means for resiliently urging said carrier bar in a direction to engage the latch plates with the supporting rails, and an operating lever pivotally mounted at one end of the gauge for engaging with the carrier bar and for moving the same to release the latch plates from the supporting rails.

13. A work guiding fence for use on the work table of a mechanically driven tool, parallel supporting bars adjacent opposite sides of the table, said fence having end portions slidably mounted on the bars, latch members adjacent the end portions of the fence, a carrier bar on which the latch members are mounted, said carrier bar being mounted for movement within the fence, resilient means urging said carrier bar in a direction to engage the latch members with the supporting bars to lock the fence to said supporting bars, an operating lever pivotally mounted at one end of the fence having cam means thereon for engaging the end of the carrier bar and for moving the same in a reverse direction to disengage the latch members from the supporting rails and unlock the fence.

14. A rip fence for use on the work table of a power operated tool, elongate supporting bars mounted adjacent opposite sides of the work table and adapted to slidably support opposite ends of the fence, said supporting bars having transversely extending longitudinally spaced apertures, said fence having a latch bar movably mounted thereon and projecting at its ends over said supporting bars, a latch plate fixedly attached to one end of the latch bar, a latch plate movably supported on the other end of the latch bar, said latch plates having latch pins adapted to engage in aligned apertures in said supporting bars, resilient means urging the latch bar in a direction to position the latch plates thereon adjacent the supporting bars and to engage the latch pins in the apertures in said supporting bars when the ends of the fence are supported on said supporting bars, resilient means urging the movable latch plate in a direction to engage the pin thereon in the aperture in the adjacent supporting bar, and cam means on the fence operable to move the latch bar in the opposite direction to release the pins on the latch plates from engagement in the apertures in the supporting bars.

15. A work guiding fence for use on a power driven machine tool having a work table, fence supporting rails adjacent opposite side edges of the work table, means associated with the fence and the supporting rails to rigidly secure the ends of the fence in selected positions on the supporting rails, brackets at one end of the table slidably receiving the fence supporting rails, rail holders at the other end of the table, said rail holders having rail receiving guideways extending parallel with the side edges of the work table and other guideways extending transversely of the table, slide blocks in said transversely extending guideways, said slide blocks having oppositely diverging diagonal cam slots, pivoted connecting members depending from the supporting rails and having head portions slidable in said cam slots whereby said supporting rails are movable along the edges of the table upon transverse movement of said slide blocks, an adjusting screw in threaded engagement with said slide blocks, said adjusting screw being journaled at one end in one of said rail holders, an externally threaded sleeve rotatably mounted on the other end of said adjusting screw, and the other one of said rail holders having a threaded aperture receiving said sleeve whereby said supporting rails may be adjusted relative to each other by rotation of said sleeve.

16. A work guiding fence for use on the work table of a mechanically driven tool, said fence having downwardly opening slotted end portions forming guideways, elongate supporting guide bars at opposite side edges of the table having upstanding portions for slidably receiving said slotted end portions whereby to support said fence thereon, latch members mounted on the end portions of the fence and movable relative to the fence, means including resilient elements for normally urging the latch members into engagement with said supporting bars to rigidly clamp said fence in selected predetermined positions on said supporting bars, means connecting said latch members for simultaneously moving the same out of engagement with said supporting bars to release said fence and permit its removal from the supporting rails in a vertical direction away from the work table.

17. In a mechanically driven tool having a work receiving table, a work guiding fence adapted to be adjustably positioned on said work table, elongate supporting bars extending along opposite edges of the table and beneath the work surface thereof for supporting opposite ends of said fence, clamp plates movably mounted in depending relation on opposite ends of said fence for rigidly securing the ends of said fence to said supporting bars at selected points along said supporting bars with the fence extending across the work table, means below the work surface of the table for mounting said fence supporting bars for sliding movement relative to said table and in parallel relation to each other and means connected with said mounting means and with said supporting bars for adjustably moving said bars along the adjacent edges of said work table in either the same direction or in opposite directions.

References Cited in the file of this patent

UNITED STATES PATENTS

| 623,156 | Humphrey | Apr. 18, 1899 |
| 904,342 | Loehr | Nov. 17, 1908 |
| 1,942,873 | Narrow | Jan. 9, 1934 |
| 2,106,288 | Tautz | Jan. 25, 1938 |
| 2,374,286 | Hargadon | Apr. 24, 1945 |
| 2,622,637 | Gustin | Dec. 23, 1952 |

FOREIGN PATENTS

| 947,006 | France | Jan. 3, 1949 |